United States Patent
Takamura

(10) Patent No.: US 8,630,260 B2
(45) Date of Patent: Jan. 14, 2014

(54) COMMUNICATION SYSTEM, COMMUNICATION METHOD AND RADIO COMMUNICATION APPARATUS

(75) Inventor: Kazuhisa Takamura, Chiba (JP)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 12/884,654

(22) Filed: Sep. 17, 2010

(65) Prior Publication Data

US 2011/0110336 A1     May 12, 2011

(30) Foreign Application Priority Data

Nov. 11, 2009   (JP) ................................ P2009-257793

(51) Int. Cl.
*H04W 4/00*   (2009.01)

(52) U.S. Cl.
USPC ......................................................... 370/331

(58) Field of Classification Search
None
See application file for complete search history.

(56) References Cited

U.S. PATENT DOCUMENTS

| 2003/0088618 | A1 | 5/2003 | Sueyoshi et al. | |
|---|---|---|---|---|
| 2004/0259548 | A1* | 12/2004 | Moon et al. | 455/436 |
| 2007/0072623 | A1* | 3/2007 | Shyr et al. | 455/456.1 |
| 2008/0069043 | A1* | 3/2008 | Kimura et al. | 370/329 |

FOREIGN PATENT DOCUMENTS

JP      2003-141064 2      5/2003

* cited by examiner

*Primary Examiner* — Otis L Thompson, Jr.
(74) *Attorney, Agent, or Firm* — Finnegan, Henderson, Farabow, Garrett & Dunner, LLP

(57) ABSTRACT

A communication system includes plural application servers; a first base station and a second base station; and a radio communication apparatus configured to use one of the application servers via the first base station, wherein, when the radio communication apparatus is handed over to the second base station, it is determined whether to switch the application server that the radio communication apparatus uses to another application server based on a communication quality of a communication path including the communication path between the second base station and the application server.

8 Claims, 14 Drawing Sheets

| APPLICATION | DELAY | COMMUNICATION SPEED | JITTER | PACKET ERROR RATE |
|---|---|---|---|---|
| GAME | < 2msec | 384k - 10Mbps | < 2msec | 0.001 |
| AR | < 10msec | 384k - 2Mbps | < 2msec | 0.001 |
| TV CONFERENCE | < 200msec | HSPA | < 10msec | 0.01 |

COMMUNICATION SYSTEM, COMMUNICATION METHOD AND RADIO COMMUNICATION APPARATUS

BACKGROUND OF THE INVENTION

1. Field of the Invention

The present invention relates to a communication system, a communication method and a radio communication apparatus.

2. Description of the Related Art

In recent years, a user device such as a radio communication apparatus is capable of executing an application via a network. There are following two concrete execution methods, for example.

(1) An execution method based on a concept such as an "X terminal" and a "thin client" (See Japanese Patent Application Laid-Open No. 2003-141064, for example).

An application server is provided on a network and executes a program (application) according to user's operation on a radio communication apparatus.

(2) An execution method based on a concept such as an "agent."

An application server is provided on a network, and a radio communication apparatus downloads a program from the application server via the network and executes the program.

In the method (1), when the distance between the radio communication apparatus and application server increases, a delay may increase or the communication speed may be reduced due to a bottleneck in a communication path. In addition, it is difficult to find a more preferable wireless network than a currently used wireless network. On the other hand, in the method (2), the radio communication apparatus may have an insufficient signal processing speed or memory capacity for an application.

There are plural base stations on the network and the radio communication apparatus can communicate with the application server by radio communication via one of the base stations. Further, when the distance from the base station increases and the radio communication quality is deteriorated, the radio communication apparatus is handed over to another base station according to need.

SUMMARY OF THE INVENTION

However, when the radio communication apparatus is handed over to another base station, the communication between the radio communication apparatus and application server is executed via a communication path between the handover destination base station and application server. The communication quality including a delay and a jitter may change accordingly so that the communication quality becomes insufficient to execute the application.

In light of the forgoing, the present invention has been made and it is desirable to provide a novel and improved communication system, communication method and radio communication apparatus capable of preventing a situation in which an undesirable influence due to a handover between base stations is imposed on an application execution via a network.

According to an embodiment of the present invention, there is provided a communication system including plural application servers, a first base station and a second base station, and a radio communication apparatus configured to use one of the application servers via the first base station. When the radio communication apparatus is handed over to the second base station, it is determined whether to switch the application server that the radio communication apparatus uses to another application server based on a communication quality of a communication path. Here, the communication path may be a communication path between the second base station and the application server, or a communication path between the radio communication apparatus and the application server including a communication path between the second base station and the application server.

When the communication quality of the communication path between the second base station and the application server fails to satisfy a predetermined criterion, the application server that the radio communication apparatus uses may be switched to the another application server whose communication quality of a communication path including the communication path with the second base station satisfies the predetermined criterion.

After confirming that the radio communication apparatus is to be handed over to the second base station, the communication quality of the communication path between the second base station and the application server may be acquired from communication between the second base station and the application server, and the communication quality of the communication path including the communication path between the second base station and the another application server may be acquired from communication between the second base station and the another application server. Also, the communication quality of the communication path between the second base station and the application server may be acquired from preparative communication between the second base station and the application server, and the communication quality of the communication path including the communication path between the second base station and the another application server may be acquired from preparative communication between the second base station and the another application server.

The application server may transmit individual information related to an application of the radio communication apparatus stored in the application server at a certain timing to the another application server and, upon receiving input information from the radio communication apparatus after starting transmission of the individual information, execute a process based on the input information and transfer the input information to the another application server, after receiving and storing the individual information from the application server, the another application server may execute a process based on the input information transferred from the application server, and switching from the application server to the another application server may be performed after the process based on the input information is completed by the another application server.

The communication system may further includes a management server configured to determine whether to switch the application server to the another application server based on the communication quality of the communication path between the second base station and the application server and the communication quality of the communication path between the second base station and the another application server. The application server may start to transmit the individual information according to an instruction from the management server.

The management server may store one or more candidate application servers in association with the second base station and instructs the one or more candidate application servers to perform the preparative communication with the second base station.

According to another embodiment of the present invention, there is provided a communication method, including the steps of using, by a radio communication apparatus, an application server via a first base station, and handing over the radio communication apparatus from the first base station to a second base station. When the radio communication apparatus is handed over to the second base station, it is determined whether to switch the application server that the radio communication apparatus uses to another application server based on a communication quality of a communication path.

According to another embodiment of the present invention, there is provided a radio communication apparatus including a communication unit configured to communicate with an application server which is currently in use via a first base station. When the radio communication apparatus is handed over to a second base station, the application server that the radio communication apparatus uses is switched to another application server in a case where a communication quality of a communication path fails to satisfy a predetermined criterion.

According to the embodiments of the present invention described above, it is possible to suppress an undesirable influence imposed on an application execution via a network due to a handover between base stations.

DETAILED DESCRIPTION OF THE EMBODIMENT

Figure 1:
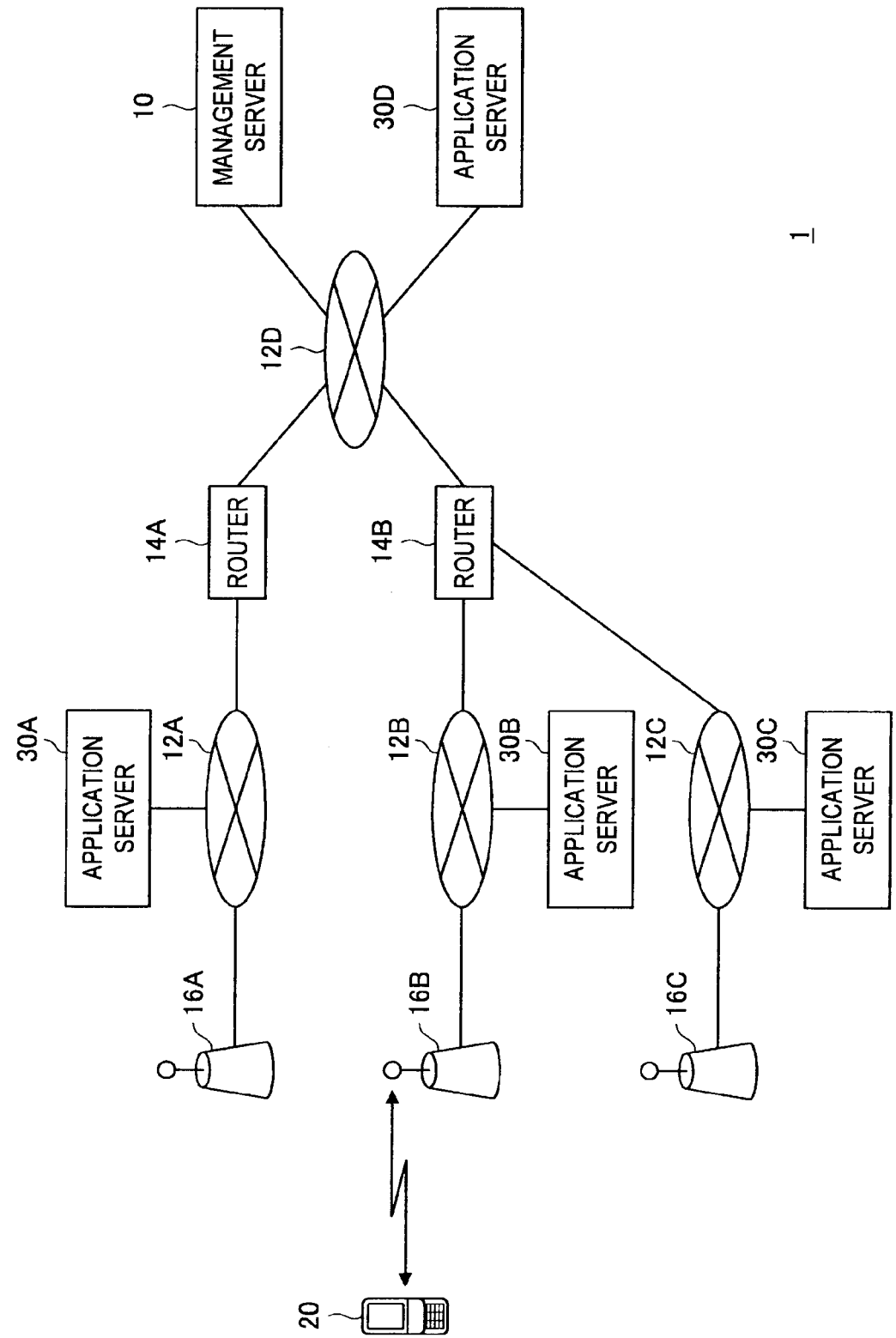
FIG. 1 is an explanatory diagram showing a configuration of a communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, structural elements that have substantially the same function and structure may be distinguished by applying different letters to the same reference numerals. For example, the structural elements that have substantially the same function and structure are distinguished as "base stations 16A, 16B and 16C" according to need. However, in a case where the respective structural elements that have substantially the same function and structure do not need to be distinguished, the same reference numerals are simply used. For example, when it is not necessary to distinguish the "base stations 16A, 16B and 16C," simply they are referred to as "base station(s) 16."

Further, "Detailed Description of the Embodiment" will be explained according to the following items in that order.

1. Outline of communication system
2. Configuration of each node
2-1. Configuration of radio communication apparatus
2-2. Configuration of application server
2-3. Configuration of management server
3. Handover
4. Acquisition (prediction) of post-handover communication quality
5. Criterion of switching application server
6. Process of switching application server
7. Conclusion <1. Outline of Communication System>

First, a communication system 1 according to an embodiment of the present invention will be schematically explained with reference to FIG. 1.

FIG. 1 is an explanatory diagram showing a configuration of the communication system 1 according to the embodiment of the present invention. As shown in FIG. 1, the communication system 1 according to the embodiment of the present invention includes a management server 10, networks 12A to 12D, routers 14A and 14B, base stations 16A to 16C, a radio communication apparatus 20, and application servers 30A to 30D.

The base stations 16A to 16C, management server 10, application servers 30A to 30D and the like are provided on or connected to the networks 12. In FIG. 1 illustrating a specific example, the base station 16A and application server 30A are connected to the network 12A; the base station 16B and application server 30B are connected to the network 12B; the base station 16C and application server 30C are connected to the network 12C; and the management server 10 and application server 30D are connected to the network 12D. Further, the networks 12A and 12D are connected via the router 14A, and the networks 12B to 12D are connected via the router 14B.

The network 12 is a wired or wireless communication path of information transmitted from a device connected to the network 12. For example, the network 12 may include a public network such as the Internet, a telephone line network and a satellite communication network, and various types of LANs (Local Area Networks) including Ethernet (registered trademark) and a WAN (Wide Area Network). Further, the network 12 may include a dedicated line network such as an IP-VPN (Internet Protocol-Virtual Private Network).

The base station 16 (an access point) is connected to the radio communication apparatus 20 and relays communication between the radio communication apparatus 20 and the network 12. For example, the base station 16 transmits a signal received from the radio communication apparatus 20 to the network 12 and transmits a signal received from the network 12 to the radio communication apparatus 20.

Note that a communication method between the base station 16 and radio communication apparatus 20 is not particularly limited. For example, the base station 16 may communicate with the radio communication apparatus 20 based on LTE (Long Term Evolution), LTE-A (LTE-Advanced), IEEE (Institute of Electrical and Electronic Engineers) 802.11a, b, g or n, WiMAX (Worldwide Interoperability for Microwave Access), or HSPA (High Speed Packet Access).

The radio communication apparatus 20 can execute an application in cooperation with the application server 30 by communicating with the application server 30 via the base station 16. For example, when connected to the base station 16B, the radio communication apparatus 20 can execute an application by communicating with the application server 30B via the base station 16B.

More specifically, the radio communication apparatus 20 may instruct the application server 30B to execute an application according to user's operation on the radio communication apparatus 20 and acquire the execution result via the base station 16B. The radio communication apparatus 20 may download an application program from the application server 30B and execute the application program.

In FIG. 1, a mobile phone is illustrated as an example of the radio communication apparatus 20; however, the radio communication apparatus 20 is not limited to the mobile phone. For example, the radio communication apparatus 20 may be an information processing apparatus such as a PC (personal computer), a home video processing device (such as a DVD recorder and a videocassette recorder), a PDA (Personal Digital Assistants), a home game machine, and a home appliance. Further, the radio communication apparatus 20 may be an information processing apparatus such as a PHS (Personal Handyphone System), a portable music player, a portable movie processing device, and a portable game machine.

The application server 30 executes an application according to an instruction or an input from the radio communication apparatus 20 and transmits a result of the execution to the radio communication apparatus 20. There may be types of the applications for playing a game, an AR, having a TV conference, searching information, playing content such as music or a video, and the like.

The management server 10 (information server) is a main control node in the communication system 1, and performs a paging process, a handover, data routing and the like. When the communication system 1 is composed of an LTE for example, the management server 10 may function as an MME (mobility management entity) or an S-GW (serving gateway).

This specification focuses on that the management server 10 determines whether to switch the application server 30 that the radio communication apparatus 20 uses and the management server 10 instructs to switch; however, the present invention is not limited to this example. For example, each application server 30 or radio communication apparatus 20 may determine the necessity of switching and perform the switching independently.

In the above communication system 1, a handover of the radio communication apparatus 20 is executed according to need. For example, when the radio communication apparatus 20 connected to the base station 16B moves away from the base station 16B, the radio communication quality between the radio communication apparatus 20 and base station 16B is deteriorated so that the radio communication apparatus 20 is handed over from the base station 16B to the base station 16C by the management server 10.

Here, if the radio communication apparatus 20 continues to use the same application server 30 before and after the handover, the communication path between the radio communication apparatus 20 and application server 30 is changed. Hereinafter, this situation will be explained in detail with reference to FIG. 2.

Figure 2:
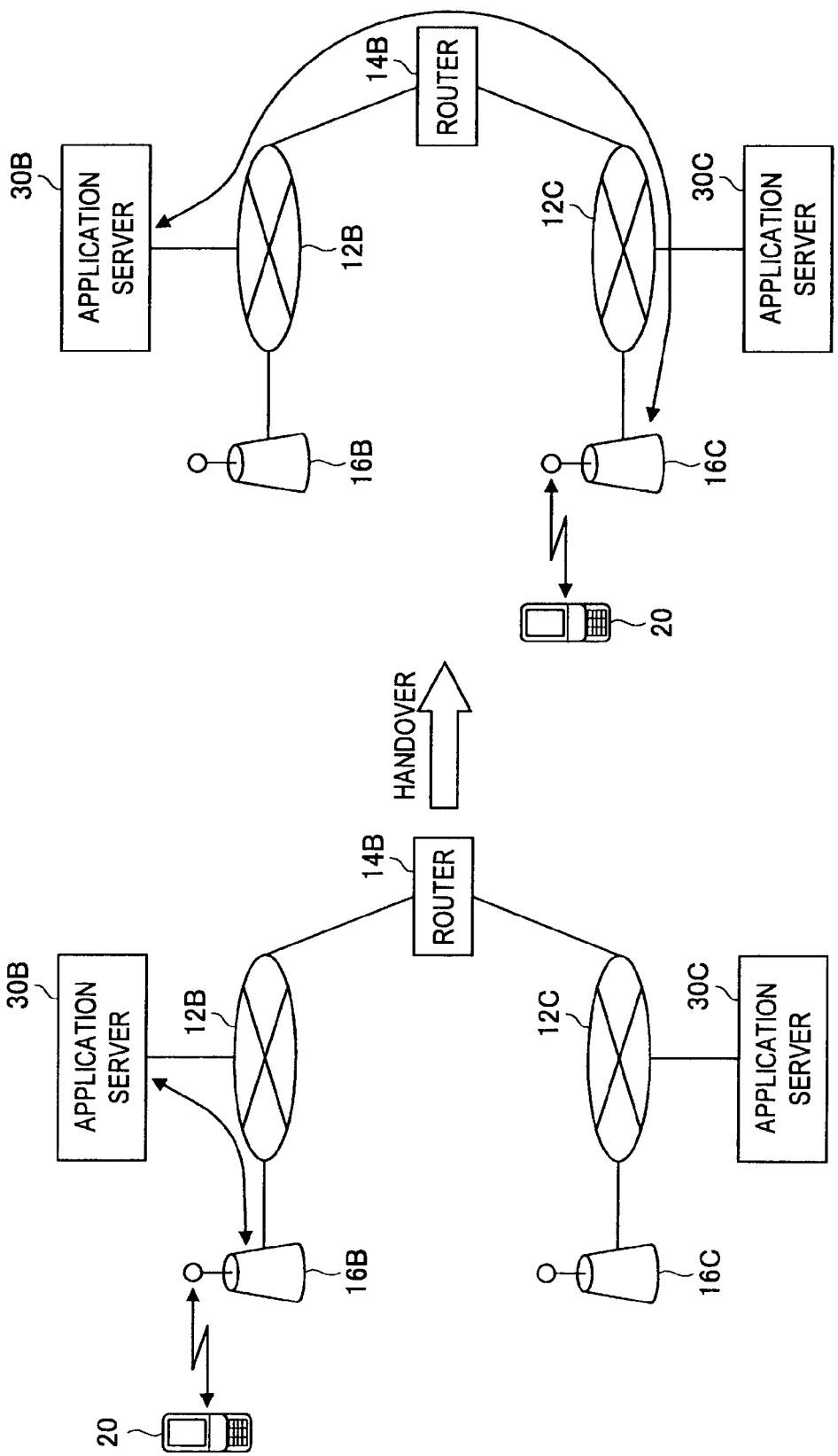
FIG. 2 is an explanatory diagram showing a change of a communication path between a radio communication apparatus and an application server due to a handover.

FIG. 2 is an explanatory diagram showing a change of a communication path between the radio communication apparatus 20 and application server 30 due to a handover. In FIG. 2, a part of the configuration is simplified for the sake of explanation. As shown in FIG. 2, the communication path between the radio communication apparatus 20 and application server 30 before the handover is from the radio communication apparatus 20, the base station 16B, the network 12B to the application server 30B in this order. Meanwhile, the communication path between the radio communication apparatus 20 and application server 30 after the handover is from the radio communication apparatus 20, the base station 16C, the router 14B, the network 12B to the application server 30B in this order.

As described above, when the radio communication apparatus 20 continues to use the same application server 30 before and after the handover, the length of the communication path between the radio communication apparatus 20 and application server 30 increases so that the communication quality to execute the application may not be satisfied.

Under the above circumstances, the communication system 1 according to the embodiment has been made. The communication system 1 according to the embodiment schematically performs the processes shown in FIG. 3.

Figure 3:
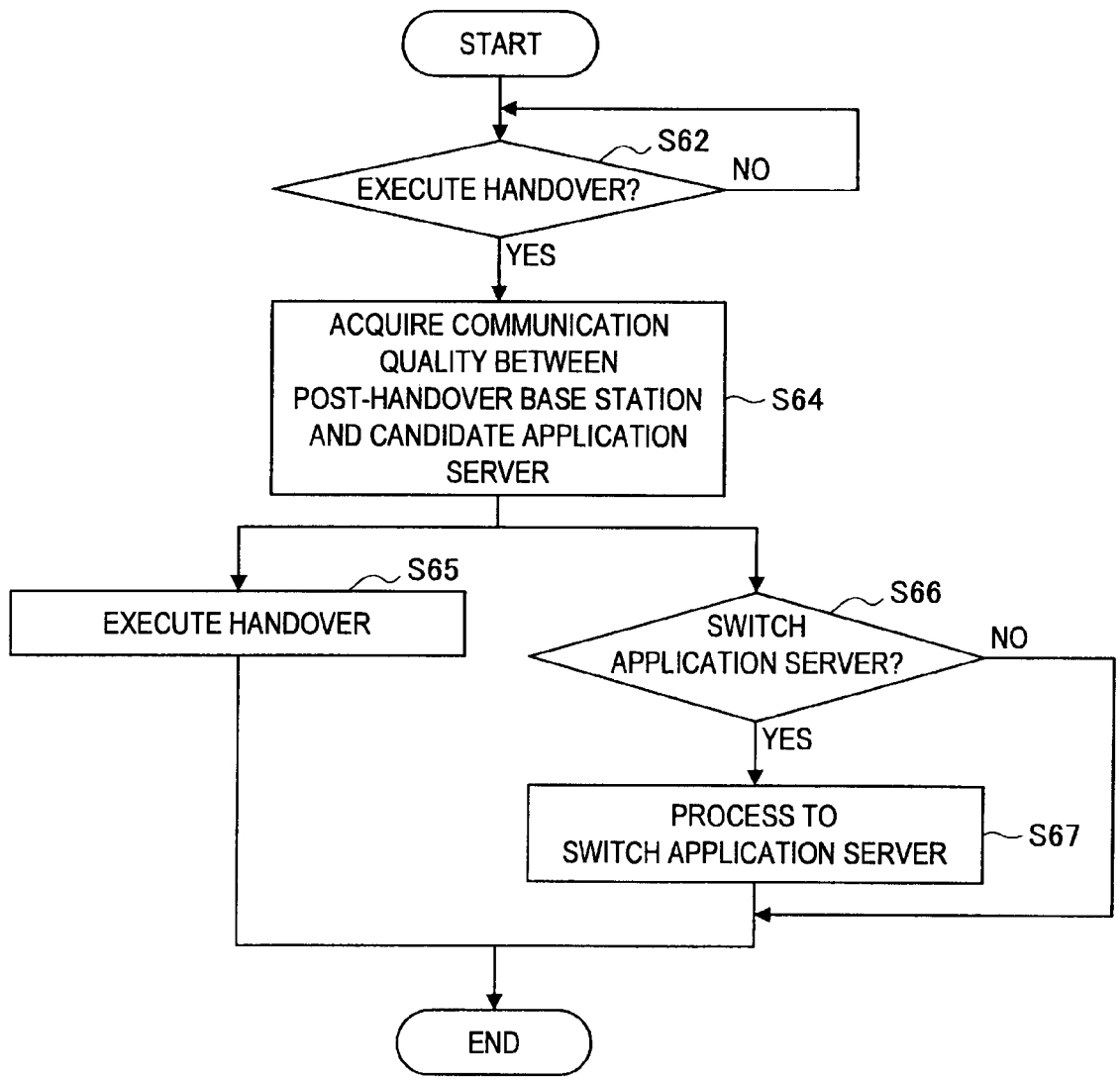
FIG. 3 is a flowchart schematically showing a process of the communication system according to the embodiment.

FIG. 3 is a flowchart schematically showing a process of the communication system 1 according to the embodiment. As shown in FIG. 3, when a handover of the radio communication apparatus 20 is to be executed (S62), the management server 10 acquires the communication quality between the handover destination base station 16 and one or more candidate application servers 30 (S64). The detail of the handover will be explained in "3. Handover," and the detail of the communication quality acquisition will be explained in "4. Acquisition (prediction) of post-handover communication quality."

After that, in parallel to the handover of the radio communication apparatus 20 (S65), the management server 10 determines the necessary of switching the application server 30 that the radio communication apparatus 20 uses based on the communication quality acquired in S64 (S66). When switching is necessary, the management server 10 instructs to execute a process of switching the application server 30 (S67). Here, the detail of the determination as to whether to switch the application server 30 will be explained in "5. Criterion of switching application server," and the detail of the process of switching the application server 30 will be explained in "6. Process of switching application server."

The communication system 1 according to the embodiment can prevent a situation in which execution of an application receives undesirable influence due to a handover. More specifically, the application server 30 used by the radio communication apparatus 20 can be switched without affecting the execution of an application. Hereinafter, the communication system 1 according to the embodiment will be explained in more detail.

<2. Configuration of Each Node>

(2-1. Configuration of Radio Communication Apparatus)

Figure 4:
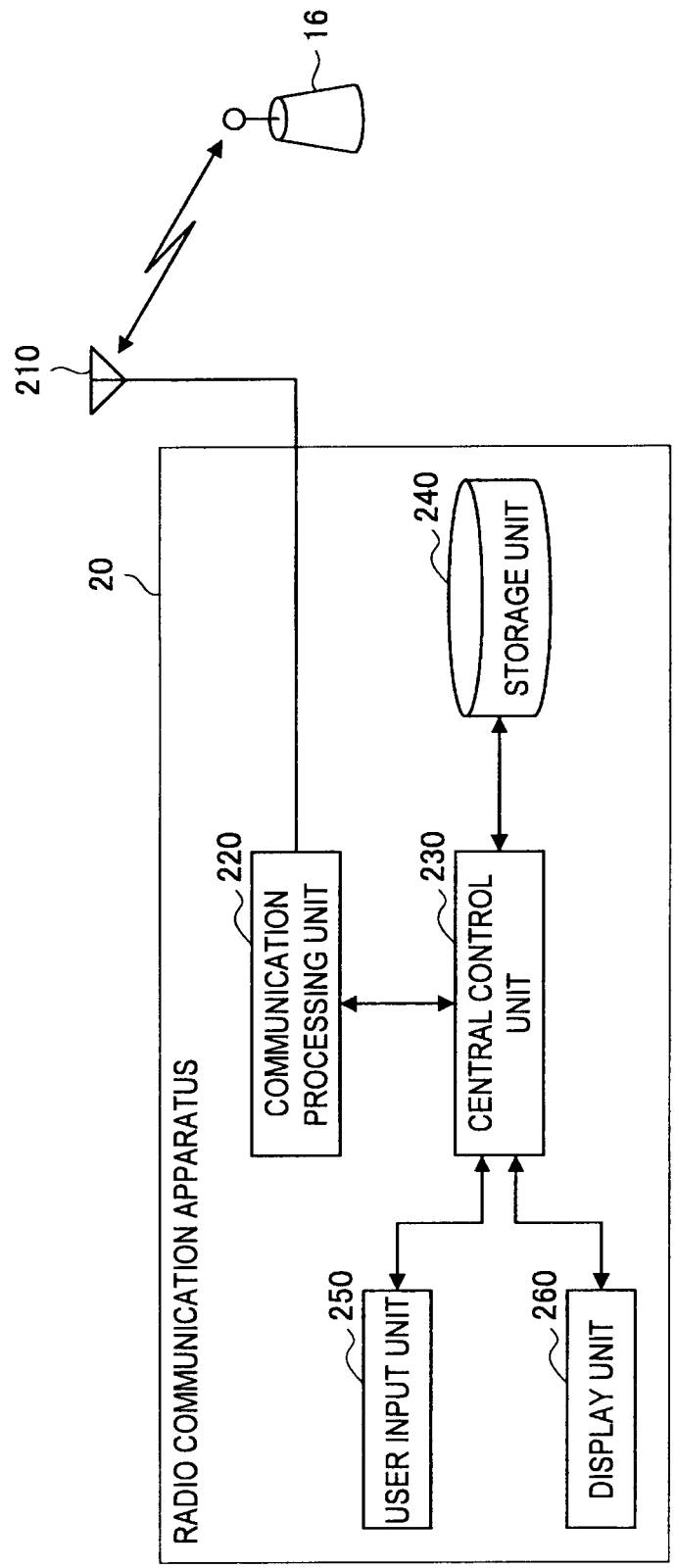
FIG. 4 is a functional block diagram showing a configuration of the radio communication apparatus according to the embodiment.

FIG. 4 is a functional block diagram showing a configuration of the radio communication apparatus 20 according to the embodiment. As shown in FIG. 4, the radio communication apparatus 20 according to the embodiment includes an antenna 210, a communication processing unit 220, a central control unit 230, a storage unit 240, a user input unit 250 and a display unit 260.

The antenna 210 is an interface for connecting to the base station 16 to transmit and receive a radio signal to and from the base station 16. More specifically, the antenna 210 converts a radio signal transmitted from the base station 16 into an electric reception signal to supply to the communication processing unit 220, and converts an electric transmission signal supplied from the communication processing unit 220 to a radio signal to transmit to the base station 16.

Here, in this embodiment, for example, input information related to an application, which is input to the user input unit 250 by a user is transmitted from the antenna 210 to the base station 16, and an execution result of the application by the application server 30 according to the input information is received from the base station 16.

Further, FIG. 4 shows a single antenna 210; however, the radio communication apparatus 20 may include plural antennas 210 to communicate with the base station 16 by MIMO (Multiple Input Multiple Output) communication.

The communication processing unit 220 performs a signal processing of a reception signal supplied from the antenna 210 and a transmission signal to be supplied to the antenna 210. For example, the communication processing unit 220 performs down conversion, analog-digital conversion, fast Fourier transform (in a case of OFDM), demodulation, decoding, and the like of a high-frequency reception signal supplied from the antenna 210. Further, the communication processing unit 220 performs coding, modulation, inverse fast Fourier transform (in a case of OFDM), digital-analog conversion, up conversion and the like of a bit string supplied from the central control unit 230.

The central control unit 230 controls the entire operation of the radio communication apparatus 20. The central control unit 230 is formed of hardware such as a CPU (Central Processing Unit), a ROM (Read Only Memory) and a RAM (Random Access Memory).

The storage unit 240 stores a program that is executed by the central control unit 230 and various data. The storage unit 240 may be a storage medium such as a nonvolatile memory, a magnetic disk, an optical disk, or an MO (Magneto Optical) disk. As the nonvolatile memory, there is an EEPROM (Electrically Erasable Programmable Read-Only Memory) and an EPROM (Erasable Programmable ROM). Further, as the magnetic disk, there are a hard disk, a disk-shaped magnetic disk and the like. Further, as the optical disk, there are a CD (Compact Disc), DVD-R (Digital Versatile Disc Recordable), BD (Blu-Ray Disc (registered trademark)) and the like.

The user input unit 250 has a configuration to which a user can input information or an instruction related to an application, and acquires input information by detecting user's input operation. For example, when the application is a fighting game in which a character fights against an opponent character, the input information may be an attacking instruction, a defending instruction and a moving instruction to the character. Here, the user input unit 250 may be a mouse, a keyboard, a touch panel, a button, a microphone, a switch, a lever and the like.

The display unit 260 displays an execution result of the application by the application server 30. For example, when the application is a fighting game and an attacking instruction is input by the user, the application server 30 executes the attack by the character, calculation of damage to an opponent character by the attack, and the like. Then, the display unit 260 displays the attack by the character, the damage to the opponent character, and the like.

Here, the display unit 260 may be a liquid crystal display (LCD) device or an OLED (Organic Light Emitting Diode). Further, the radio communication apparatus 20 may further include a sound output unit such as a speaker, an earphone, a headphone or the like used to output sound related to the application although it is not shown in FIG. 4.

(2-2. Configuration of Application Server)

Figure 5:
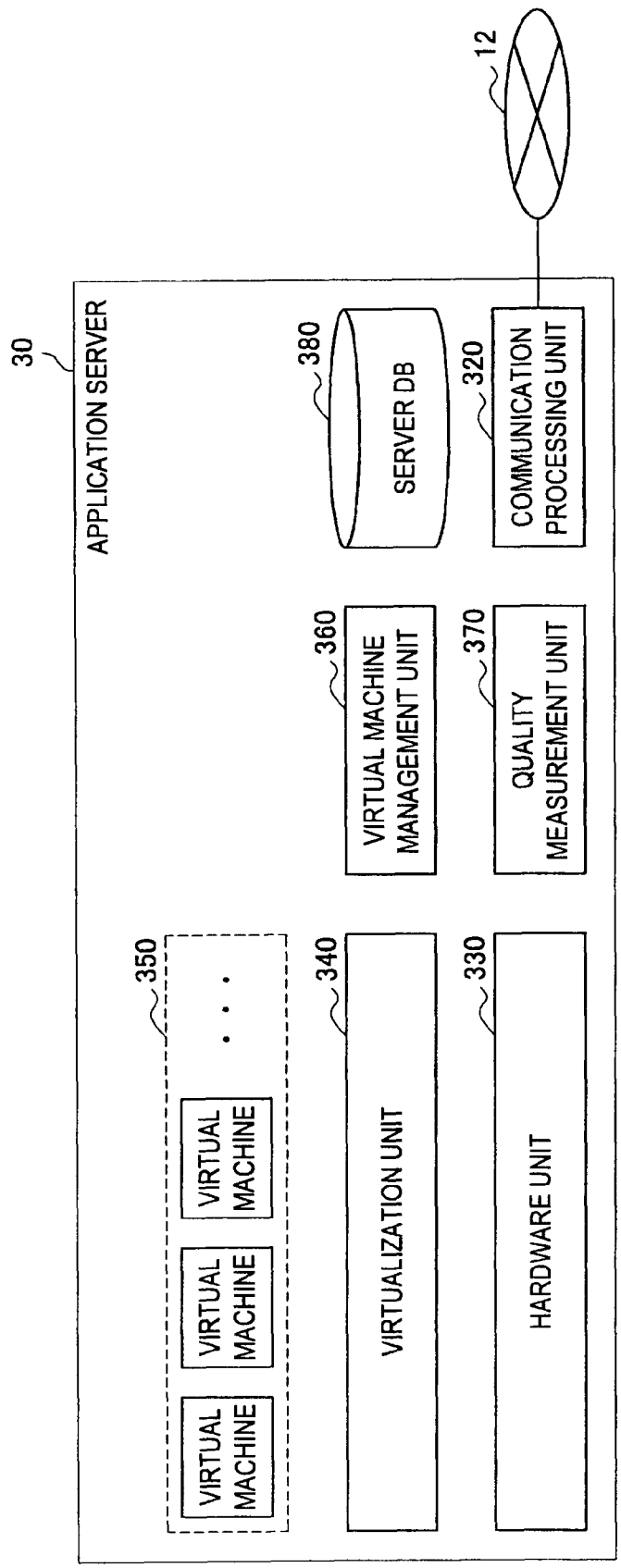
FIG. 5 is a functional block diagram showing a configuration of the application server according to the embodiment.

FIG. 5 is a functional block diagram showing a configuration of the application server 30 according to the embodiment. As shown in FIG. 5, the application server 30 includes a communication processing unit 320, a hardware unit 330, a virtualization unit 340, plural virtual machines 350, a virtual machine management unit 360, a quality measurement unit 370, and a server DB 380.

The communication processing unit 320 communicates with the network 12. For example, the communication processing unit 320 receives input information related to the application, which is input by the user of the radio communication apparatus 20, from the network 12 and transmits an execution result of the application according to the input information to the radio communication apparatus 20 via the network 12.

The hardware 330 includes a CPU and a memory, and plural virtual machines 350 are implemented on the hardware. The virtual machine management unit 360 dynamically allocates virtual machine resources according to a specification of the application. The application is executed in the allocated virtual machine resource.

The quality measurement unit 370 measures and manages an application execution quality (Qos) and a communication quality. The server DB 380 includes information related to peripheral application servers. For example, the server DB 380 of the application server 30B shown in FIG. 1 may include location information of the application server 30C.

(2-3. Configuration of Management Server)

Figure 6:
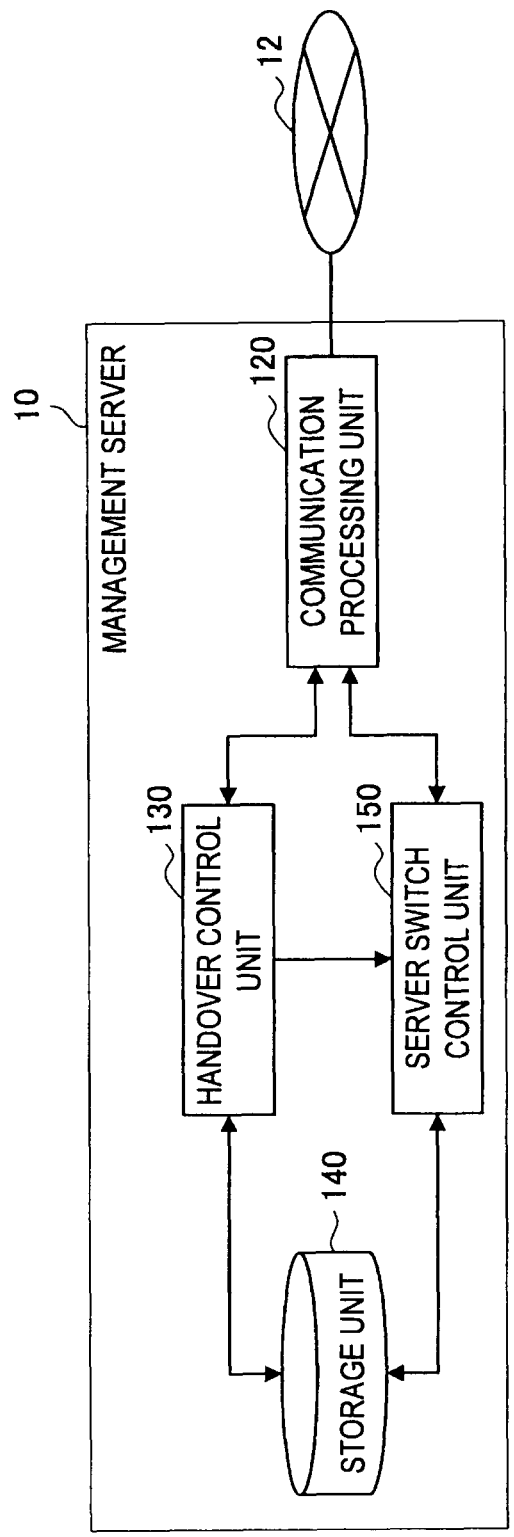
FIG. 6 is a functional block diagram showing a configuration of a management server according to the embodiment.

FIG. 6 is a functional block diagram showing a configuration of the management server 10 according to the embodiment. As shown in FIG. 6, the management server 10 according to the embodiment includes a communication processing unit 120, a handover control unit 130, a storage unit 140, and a server switch control unit 150.

The communication processing unit 120 communicates with the network 12. For example, the communication processing unit 120 transmits and receives information for a handover to and from the base station 16 and the radio communication apparatus 20 via the network 12 and transmits an instruction to switch the application server 30.

The handover control unit 130 controls the handover of the radio communication apparatus 20. For example, when a request for information about a peripheral base station is received from the radio communication apparatus 20, the handover control unit 130 may read information for connecting to the peripheral base station of the radio communication apparatus 20 from the storage unit 140 and instruct the communication processing unit 120 to transmit the information. Here, as described in "3. Handover," the handover may be executed on the initiative of the management server 10 or may be executed on the initiative of the radio communication apparatus 20.

The storage unit 140 stores information related to the base stations 16 included in the communication system 1 and information related to the application servers 30. Further, the storage unit 140 may store the respective base stations 16 in association with one or more candidate application servers 30.

For example, the base station 16B may be associated with the application servers 30B and 30D, and the base station 16C may be associated with the application servers 30B and 30C. In this case, the candidate application servers 30 which are able to connect with the radio communication apparatus 20 communicating with the base station 16B are the application servers 30B and 30D, and the candidate application servers 30 which are able to connect with the radio communication apparatus 20 communicating with the base station 16C are the application servers 30B and 30C.

When the radio communication apparatus 20 is handed over, the server switch control unit 150 determines the necessity of switching the application server 30 that the radio communication apparatus 20 is using, and instructs a switch of the application server 30 when it is determined that there is the necessity of switching. This process will be explained in detail in "4. Acquisition (prediction) of post-handover communication quality" and "5. Criterion of switching application server."

The configurations of the respective nodes have been explained with reference to FIGS. 4 to 6. Processes and controls executed in the communication system 1 according to the embodiment will be explained in detail.

<3. Handover>

When the radio communication apparatus 20 moves away from the base station 16 or there is an obstacle between the radio communication apparatus 20 and base station 16, the radio communication quality between the radio communication apparatus 20 and base station 16 is deteriorated and the communication becomes inefficient. Here, when the radio communication quality between the radio communication apparatus 20 and base station 16 is deteriorated, the radio communication apparatus 20 is handed over to another base station that can maintain better radio communication quality to improve the communication efficiency.

Since the handover may be executed on the initiative of the radio communication apparatus 20 or the management server 10, an example of a handover executed on the initiative of the radio communication apparatus 20 and an example of a handover executed on the initiative of the management server 10 will be explained in this order.

(Handover Executed on Initiative of Radio Communication Apparatus 20)

Figure 7:
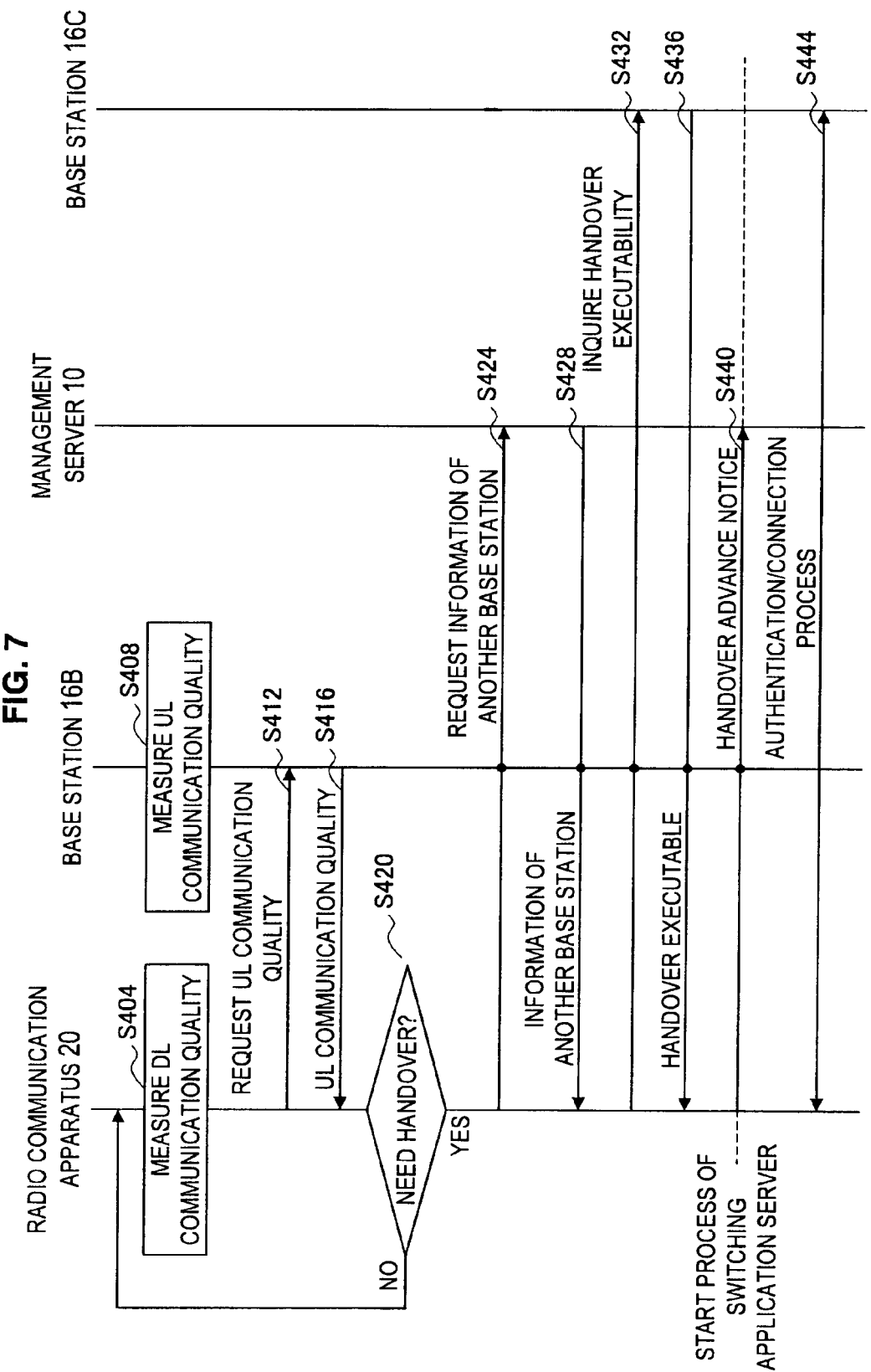
FIG. 7 is a sequence diagram showing an example of a handover executed on the initiative of the radio communication apparatus.

FIG. 7 is a sequence diagram showing an example of a handover executed on the initiative of the radio communication apparatus 20. Here, in FIG. 7, it is assumed that the radio communication apparatus 20 is in the coverage of the base station 16B and uses the application server 30B via the base station 16B.

In this case, the radio communication apparatus 20 measures the downlink (DL) communication quality based on a radio signal (a reference signal or a pilot signal, for example) transmitted from the base station 16B (S404). Similarly, the base station 16B measures the uplink (UL) communication quality based on a radio signal (a reference signal or a pilot signal, for example) transmitted from the radio communication apparatus 20 (S408).

After that, the radio communication apparatus 20 requests a uplink communication quality measurement result (CQI report) to the base station 16B (S412), and the base station 16B transmits the uplink communication quality measurement result to the radio communication apparatus 20 in response to the request (S416).

Then, the radio communication apparatus 20 determines the necessity of a handover based on the uplink communication quality and downlink communication quality (S420). For example, the radio communication apparatus 20 may determine to execute a handover when at least one of the uplink communication quality and downlink communication quality is less than a threshold value. Here, the communication quality may be signal strength information.

Then, when determined to execute a handover, the radio communication apparatus 20 requests information of other base stations existing in a range where handover is executable (S424). The management server 10 transmits information of other base stations to the radio communication apparatus 20 via the base station 16B (S428). Here, the information of other base stations may be connection information to connect to those base stations.

After that, the radio communication apparatus 20 inquires of the base station 16C whether a handover is executable, based on the information of other base stations received from the management server 10 (S432). Then, upon receiving information indicating that the handover is executable from the base station 16C (S436), the radio communication apparatus 20 notifies the management server 10 of an execution of the handover to the base station 16C (S440). Then, the radio communication apparatus 20 and base station 16C execute an authentication/connection process (S444) to complete the handover of the radio communication apparatus 20 to the base station 16C.

Here, the management server 10 may start a process of switching the application server 30B used by the radio communication apparatus 20 after receiving the notification in S440. Further, in this example, communication between the radio communication apparatus 20 and management server 10 is performed via the base station 16B; however, when the radio communication apparatus 20 is also communicable with other base stations (the base station 16A, for example), the communication may be performed via a different base station.

(Handover Executed on Initiative of Management Server 10)

Figure 8:
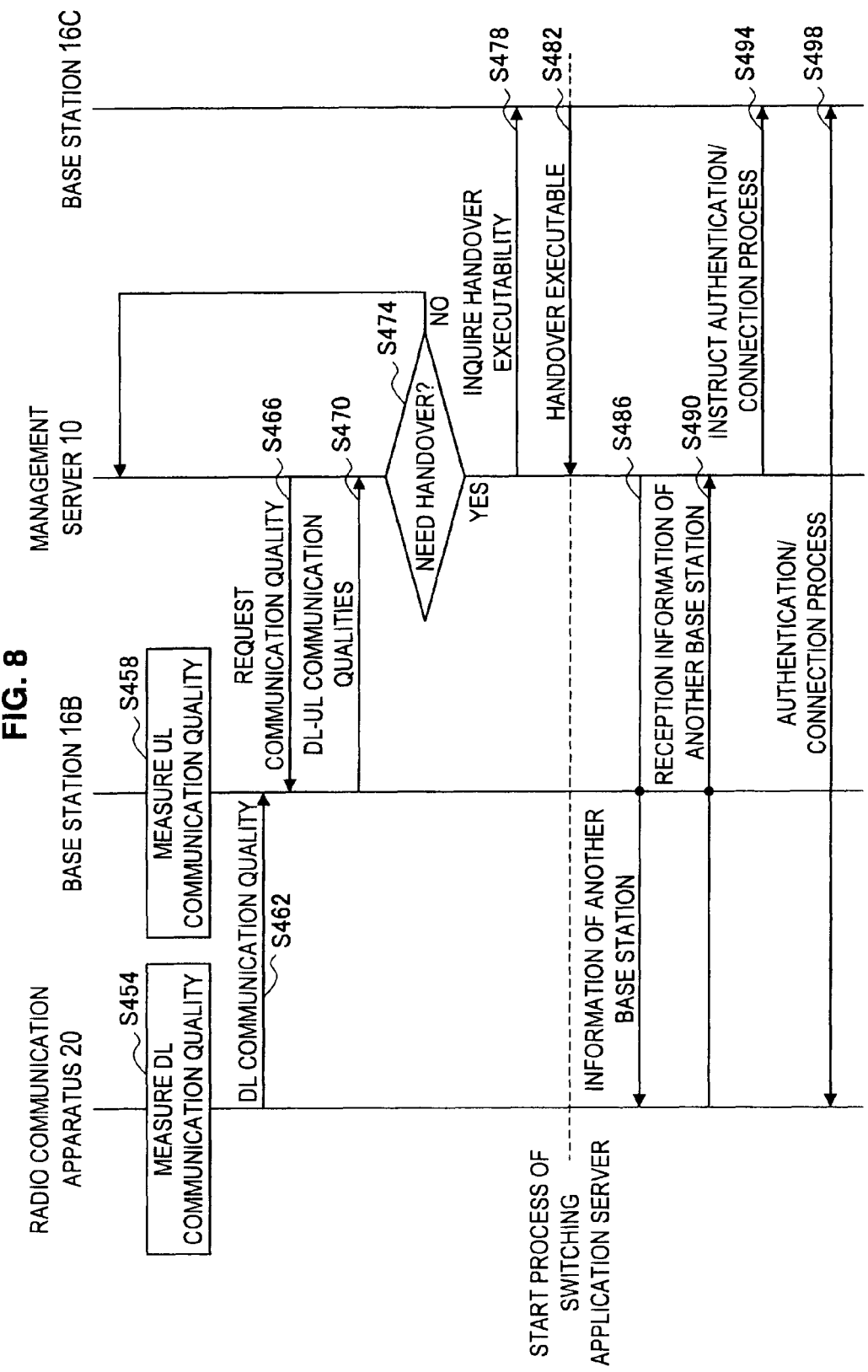
FIG. 8 is a sequence diagram showing an example of a handover executed on the initiative of the management server.

FIG. 8 is a sequence diagram showing an example of a handover executed on the initiative of the management server 10. Here, in FIG. 8, it is assumed that the radio communication apparatus 20 is in the coverage of the base station 16B and uses the application server 30B via the base station 16B.

In this case, the radio communication apparatus 20 measures the downlink (DL) communication quality based on a radio signal (a reference signal or a pilot signal, for example) transmitted from the base station 16B (S454). Then, the radio communication apparatus 20 reports the measured downlink communication quality to the base station 16B. Similarly, the base station 16B measures the uplink (UL) communication quality based on a radio signal (a reference signal and a pilot signal, for example) transmitted from the radio communication apparatus 20 (S458).

After that, the management server 10 requests the base station 16B the communication quality (S466) and the base station 16B transmits the uplink communication quality measured in S458 and the downlink communication quality reported from the radio communication apparatus 20 to the management server 10 in response to the request (S470). Here, the request for the communication quality by the management server 10 may be periodically performed or an action of the radio communication apparatus 20 may trigger the request.

Then, the management server 10 determines the necessity of a handover of the radio communication apparatus 20 based on the uplink communication quality and downlink communication quality (S474). Then, when determined to execute the handover, the management server 10 extracts base stations located near the radio communication apparatus 20 (the base station 16C in the example of FIG. 8) and inquires of the base station 16C whether the handover is executable (S478).

After that, upon receiving information indicating that the handover is executable from the base station 16C (S482), the management server 10 transmits information for connecting to the base station 16C to the radio communication apparatus 20 (S486).

Then, upon confirming that the radio communication apparatus 20 receives a signal from the base station 16C (S490), the management server 10 instructs the base station 16C and radio communication apparatus 20 to execute an authentication/connection process (S494). After that, the radio communication apparatus 20 and base station 16C execute the authentication/connection process (S498) to complete the handover of the radio communication apparatus 20 to the base station 16C.

Here, the management server 10 may start the process of switching the application server 30B that the radio communication apparatus 20 uses, after receiving the information indicating that the handover is executable from the base station 16C in S482. Alternatively, the management server 10 may start the process of switching the application server 30B that the radio communication apparatus 20 uses, after confirming that the radio communication apparatus 20 receives a signal from the base station 16C in S490.

<4. Acquisition (Prediction) of Post-handover Communication Quality>

According to the embodiment, it is determined whether to switch the application server 30 to use by predicting the communication qualities with the handover destination base station 16 and one or more application servers 30 before the handover. Hereinafter, the prediction of the communication quality after the handover will be explained in detail.

After checking the handover destination base station of the radio communication apparatus 20, the management server 10 instructs one or more candidate application servers 30 corresponding to the handover destination base station to acquire the communication quality with the destination base station. Then, the one or more candidate application servers 30 acquire the communication qualities with the handover destination base station to report to the management server 10. Hereinafter, referring to FIG. 9, a sequence of the case where the handover destination base station is the base station 16C and the candidate application servers 30 are the application servers 30B and 30C will be explained.

Figure 9:
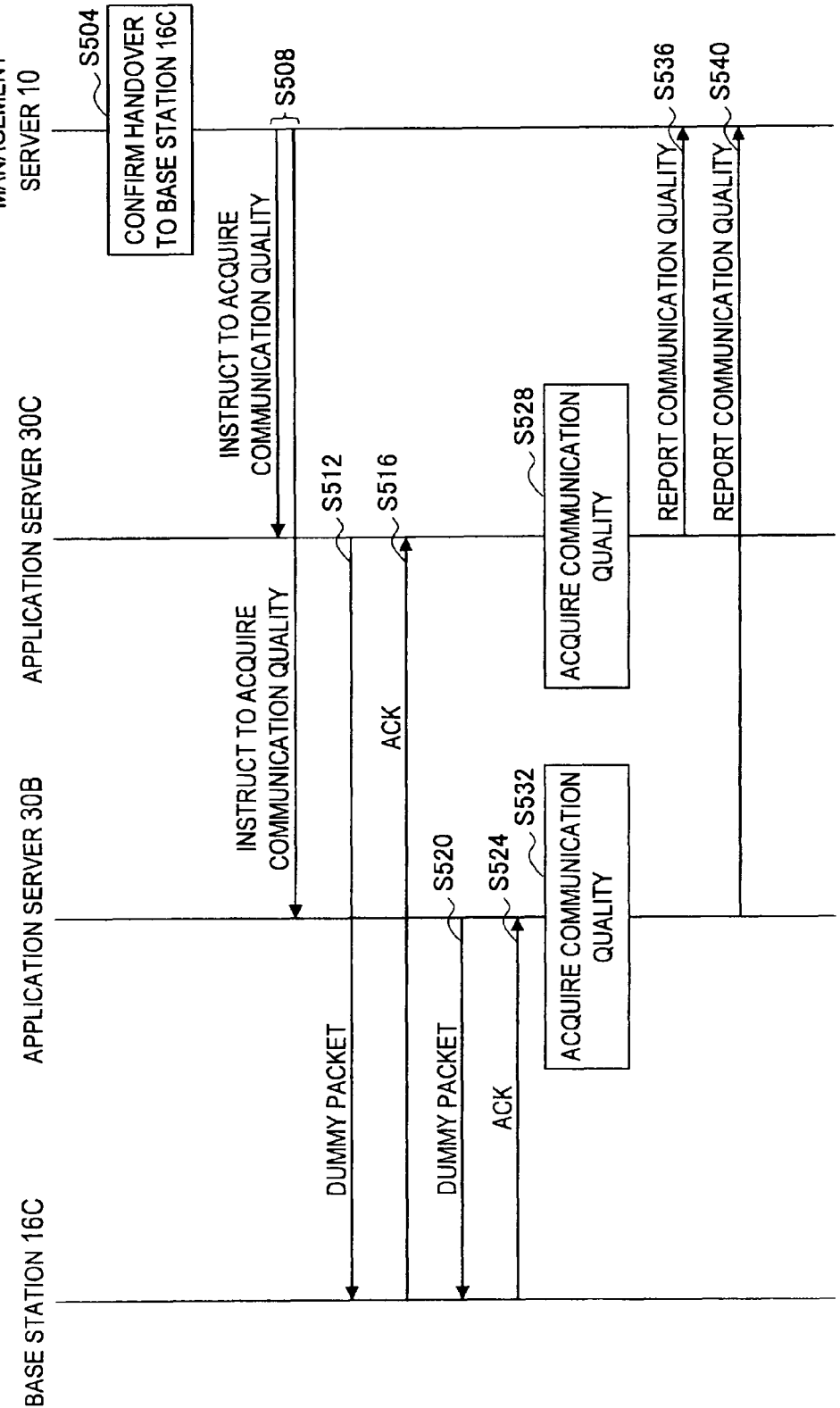
FIG. 9 is a sequence diagram showing a flow of obtaining a communication quality after a handover.

FIG. 9 is a sequence diagram showing a flow of acquiring a communication quality after a handover. As shown in FIG. 9, after confirming that the radio communication apparatus 20 is going to be handed over to the base station 16C (S504), the management server 10 instructs the application servers 30B and 30C to acquire communication qualities with the base station 16C (S508).

Here, the management server 10 may confirm that the radio communication apparatus 20 is to be handed over to the base station 16C based on a notification from the radio communication apparatus 20 as shown in S440 of FIG. 7 or information indicating that the handover is executable received from the base station 16C as shown in S482 of FIG. 8. Further, the management server 10 may transmit location information of the base station 16C together with the instruction for acquiring the communication quality to the application servers 30B and 30C.

The application server 30C transmits a dummy packet to the base station 16C according to the instruction from the management server 10 (S512). This dummy packet is a packet to measure communication quality and the content of the packet is not limited, so the packet may be a calibration packet which does not include actual data. Then, the application server 30C receives an ACK from the base station 16C in response to the dummy packet (S516). Here, the transmission and reception of the dummy packet and ACK may be executed more than one time for a predetermined period of time.

Similarly, the application server 30B transmits a dummy packet to the base station 16C according to the instruction from the management server 10 (S520). Then, the application server 30B receives an ACK from the base station 16C in response to the dummy packet (S524).

After that, the application server 30C acquires the communication quality with the base station 16C based on the communications (S512 and S516) with the base station 16C. Here, the communication quality may include a delay time, a jitter, a packet error rate, a communication speed, and the like.

Similarly, the application server 30B acquires communication quality with the base station 16C based on the communications (S520 and S524) with the base station 16C. Then, the application servers 30B and 30C report the acquired communication qualities to the management server 10 (S536, S540).

In this example, each application server 30 acquires the communication quality when a handover is executed; however, the embodiment is not limited to this example. For example, the management server 10 or the application server 30 may measure the communication quality between the handover destination base station 16 and application server 30 in advance and hold the measurement result. On the other hand, when it is predicted that the communication environment significantly changes as time passes, the communication quality may be measured when a handover is requested as described above.

Further, in this example referring to FIG. 9, the communication quality between the handover destination base station 16C and application server 30 is predicted; however, the communication quality between the radio communication apparatus 20 and the handover destination base station 16C also affects the execution of the application. Thus, it is effective to further predict the communication quality between the radio communication apparatus 20 and handover destination base station 16C.

For example, the radio communication apparatus 20 can receive a radio signal (for example, a synchronizing signal) transmitted from the handover destination base station 16C even before executing a handover. Further, the communication speed and the packet error rate between the radio communication apparatus 20 and handover destination base station 16C are affected by a reception strength of the radio communication apparatus 20.

Thus, the radio communication apparatus 20 may measure a reception strength of the radio signal transmitted from the base station 16C and report to the management server 10, and the management server 10 may predict the communication quality between the radio communication apparatus 20 and base station 16C based on the reported measured result.

For example, the management server 10 may convert the reception strength into a communication speed or a packet error rate between the radio communication apparatus 20 and handover destination base station 16C and calculate the communication speed or packet error rate between the radio communication apparatus 20 and the application server 30C based on the communication speed or packet error rate between the radio communication apparatus 20 and handover destination base station 16C and the communication speed or packet error rate between the application server 30C and base station 16C.

Further, it is considered that a congestion degree of communication (for example, a utilization ratio of a resource block) in the base station 16C may affect the delay time and communication speed between the radio communication apparatus 20 and handover destination base station 16C. The management server 10 may predict the communication quality between the radio communication apparatus 20 and base station 16C by acquiring the congestion degree of the base station 16C from the base station 16C.

For example, the management server 10 may convert the congestion degree of the base station 16C into a delay time or a packet error rate between the radio communication apparatus 20 and handover destination base station 16C and calculate the delay time and packet error rate between the radio communication apparatus 20 and application server 30C based on the delay time and packet error rate between the radio communication apparatus 20 and destination base station 16C and the delay time and packet error rate between the application server 30C and base station 16C.

<5. Criterion of Switching Application Server>
(Summary)

Next, a criterion of determining whether to switch the application server 30 that the radio communication apparatus 20 is using will be explained. The management server 10 determines the necessity of switching based on the communication quality between the radio communication apparatus 20 and handover destination base station 16 and/or one or more application servers 30, which has been explained in "4. Acquisition (prediction) of post-handover communication quality." Then, when it is determined that the switching is necessary, the management server 10 transmits information of the switching destination application server 30 to the currently used application server 30 and instructs to switch (transfer). Hereinafter, FIG. 10 will be referred to for explanation.

Figure 10:
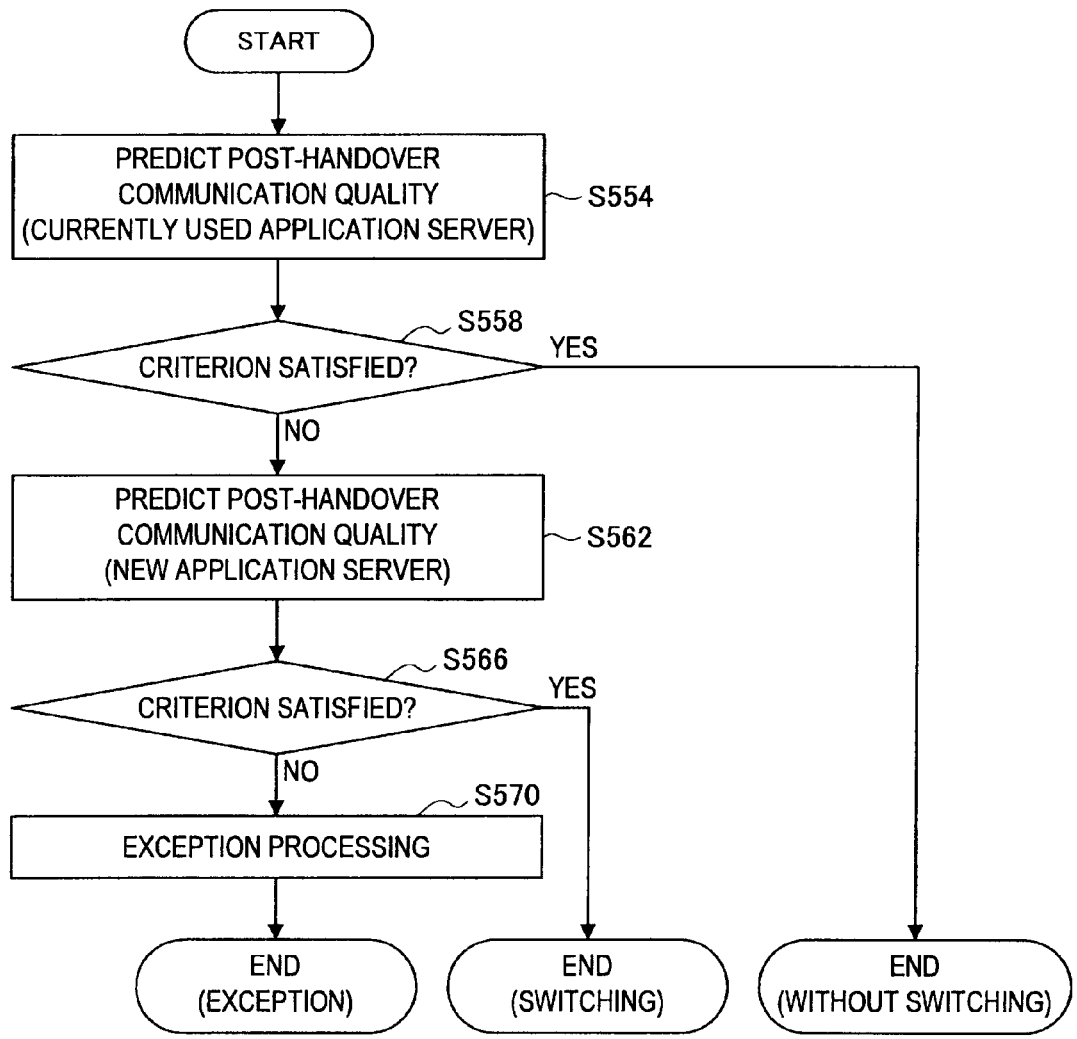
FIG. 10 is a flowchart showing a flow of determination process by the management server.

FIG. 10 is a flowchart showing a flow of a determination process by the management server 10. First, the management server 10 predicts (acquires) the communication quality after the handover regarding the application server 30 that the radio communication apparatus 20 is currently using (S554). Here, when the post-handover communication quality of the currently used application server 30 satisfies a predetermined criterion, the management server 10 does not switch the application server (S558).

On the other hand, when the post-handover communication quality of the currently used application server 30 does not satisfy the predetermined criterion, the management server 10 predicts (acquires) the post-handover communication quality of new application server 30 (S562). Here, when the post-handover communication quality of the new application server 30 satisfies the predetermined criterion, the management server 10 determines to switch the currently used application server 30 to the new application server 30 (S566). On the other hand, when the post-handover communication quality of the new application server 30 does not satisfy the predetermined criterion either, the management server 10 executes an exception processing (S570).

According to the determination process, for example, when the communication quality between the application server 30B that the radio communication apparatus 20 is currently using and the handover destination base station 16C does not satisfy the predetermined criterion, the management server 10 determines to switch the application server 30B to the application server 30C whose communication quality with the base station 16C satisfies the predetermined criterion.

Further, when the communication quality between the application server 30 and base station 16C does not satisfy the predetermined criterion, the management server 10 executes an exception processing. For example, the management server 10 may instruct the radio communication apparatus 20 to stop using the application server 30 or notify the application server 30 that the communication quality does not satisfy the predetermined criterion.

In the above example, the determination of necessity of switching is made based on whether the communication quality between the application server 30 and the base station 16 satisfies the predetermined criterion; however, the present embodiment is not limited to this example. For example, as described in "4. Acquisition (prediction) of post-handover communication quality," the management server 10 may acquire the communication quality between the radio communication apparatus 20 and application server 30 including the communication quality between the radio communication apparatus 20 and base station 16, and determine the necessity of switching based on whether the communication quality satisfies the predetermined criterion.

Further, in the above example, it has been described that, when the radio communication apparatus 20 uses the application server 30B and the communication quality between the handover destination base station 16C and application server 30B satisfies the predetermined criterion, the usage of the application server 30B is continued. However, the present embodiment is not limited to this example. For example, the management server 10 may switch the application server 30 that the radio communication apparatus 20 is currently using to an application server 30 having a more preferable communication path with the handover destination base station 16, even when the communication quality between the currently used application server 30 and handover destination base station 16 satisfies the predetermined criterion.

(Criterion of Communication Quality)

The predetermined criterion may be a communication quality capable of maintaining the minimum application execution quality and a communication quality that satisfies the requirement of the application. For example, the predetermined criterion may be one of or a combination of an upper limit of the delay time, an allowance range of communication speed, an upper limit of jitter, and an allowable value of packet error rate and a weighted evaluation value.

Here, the communication quality capable of maintaining the minimum execution quality differs according to the type of application. For example, the delay time allowable in a game application is more severe then the delay time allowable in an information searching application such as a train route finder. Thus, the predetermined criterion may be set to each application. Alternatively, the predetermined criterion may be set according to Qos class of each application. Hereinafter, a detailed example of criteria of each application will be explained with reference to FIG. 11.

Figures 11, 12:
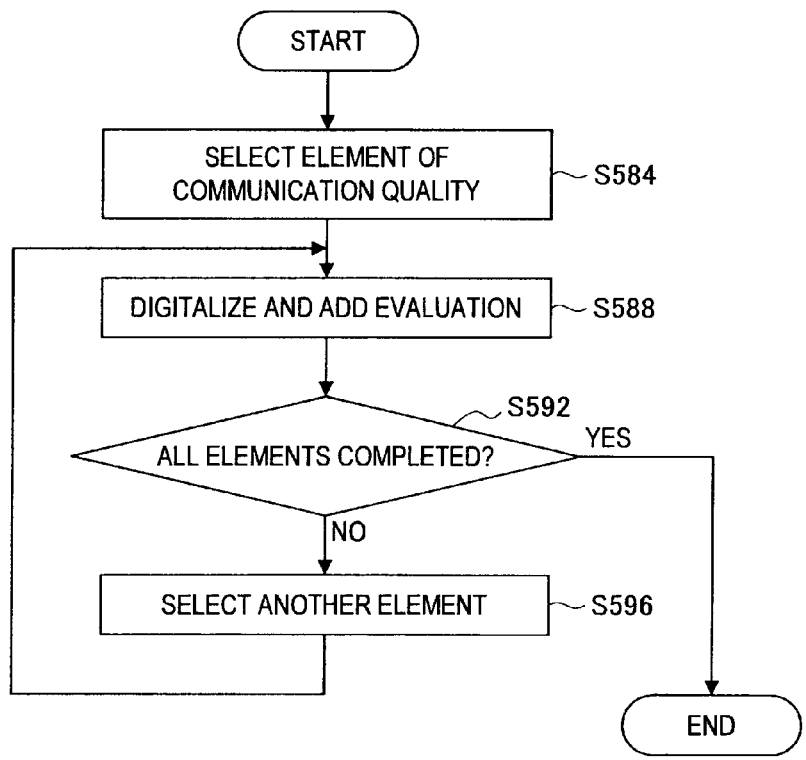
FIG. 11 is an explanatory diagram showing a concrete example of a criterion of a communication quality of each application.
FIG. 12 is a flowchart showing a flow of a communication quality evaluation.

FIG. 11 is an explanatory diagram showing concrete examples of criteria of communication qualities in each application. In the example shown in FIG. 11, when the application being executed is a game, the upper limit of delay time is 2 msec, the range of the communication speed is 384 kbps to 10 Mbps, the upper limit of jitter is 2 msec, and allowance value of packet error rate is 0.001. Here, the delay time may be a delay from transmission of a packet by the application server 30 to reception of the packet by the radio communication apparatus 20. The communication speed may be an average communication speed within a predetermined length of time period. The jitter may be an average jitter within a predetermined number of packets and a predetermined time period. The packet error rate may be an error rate in a predetermined number of packets, a predetermined packet length, a predetermined transmission/reception method, or a predetermined error correction method.

(Determination Whether the Criterion is Satisfied)

The management server 10 may determine whether each element of communication quality satisfies the above condition and determine that the criterion is not satisfied when at least one element does not satisfy the condition. Alternatively, the management server 10 may digitalize the communication quality elements to evaluation values, determines that the criterion is satisfied when the result of the evaluation value addition exceeds a predetermined value, and determines that the criterion is not satisfied when the result is equal to or less than the predetermined value. The flow in which the management server 10 adds the evaluation values is shown in FIG. 12.

FIG. 12 is a flowchart showing a flow of a communication quality evaluation. As shown in FIG. 12, the management server 10 first selects one of the elements of the acquired communication quality (S584). Then, the management server 10 digitalizes (weights) the selected communication quality element as an evaluation value (S588). After that, until the digitalization of all elements is completed (S592), the management server 10 selects another element (S596), digitalizes the selected communication quality element as an evaluation value and adds the evaluation value to other elements (S588). The result of adding the evaluation values of all elements obtained as described above is used as the entire evaluation of the communication quality.

Here, the management server 10 may determine the necessity of switching the server by executing an AHP (analytic hierarchy process) or a Bayes' estimation regarding the respective elements of the communication quality.

<6. Process of Switching Application Server>

As described above, when a handover of the radio communication apparatus 20 is executed, the management server 10 determines the necessity of switching the application server 30 that the radio communication apparatus 20 is using and the application server 30 is switched according to the determination result. However, when the application server 30 is simply switched, the usage of the application is suspended and the state of the application execution may be initialized. Thus, hereinafter, a concrete process to switch the application server 30, which can avoid the above problem, will be explained.

Figure 13:
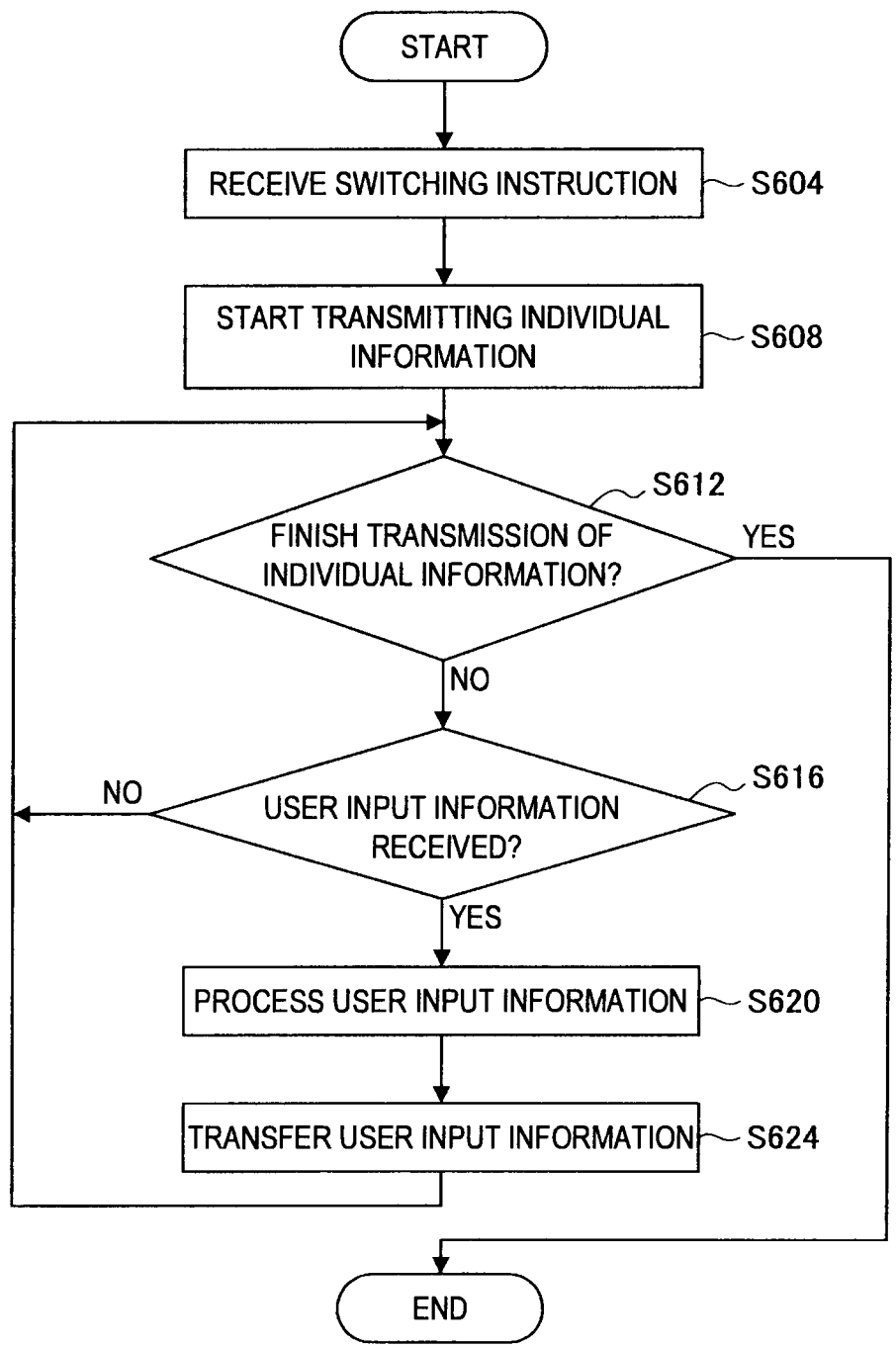
FIG. 13 is a flowchart showing a flow of a process to switch the currently used application server.

FIG. 13 is a flowchart showing a flow of a switching process by the currently used application server 30. As shown in FIG. 13, upon receiving an instruction (a transfer instruction) of switching to another application server 30 from the management server 10 (S604), the application server 30 starts to transmit individual information (user information) at the current timing of the application of the radio communication apparatus 20 to another application server 30 (S608).

Here, the individual information is information that indicates a progressing state of the application at the current timing. For example, when the application is a game, the individual information may be information equivalent to saved information used to restart the game from the progressing state when the game is suspended.

More specifically, the individual information may be a current position, current state or possessions or the like of a character in the game.

After that, upon receiving user input information from the radio communication apparatus 20 during transmission of individual information (S612, S616), the application server 30 processes the user input information and transmits the application execution result to the radio communication apparatus 20 (S620). Further, the application server 30 transfers the user input information to the switching destination application server 30 (S624). The application server 30 repeats the processing and transferring of the user input information until the transmission of the individual information is completed.

Figure 14:
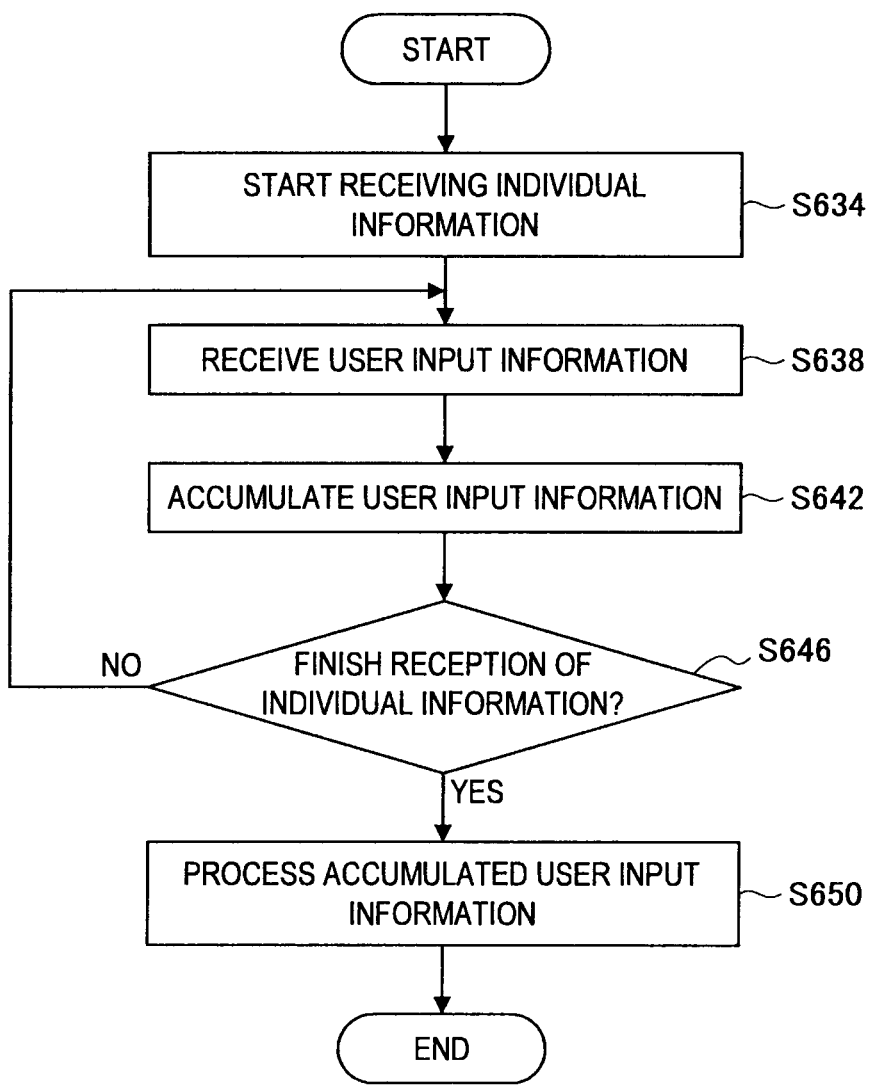
FIG. 14 is a flowchart showing a flow of a switching process by a destination application server.

FIG. 14 is a flowchart showing a flow of switching process by the destination application server 30. As shown in FIG. 14, the switching destination application server 30 starts to receive individual information from the currently used application server 30 (S634) and, when the user input information is received (S638), accumulates the user input information (S642).

Then, when the reception of the individual information is completed, the destination application server 30 applies the received individual information to the application and processes the user input information accumulated in the applied application (S650). With this configuration, since the application progressing state in the switching destination application server 30 and the progressing state in the currently used application server 30 match each other, switching of the application servers 30 can be performed smoothly.

Figure 15:
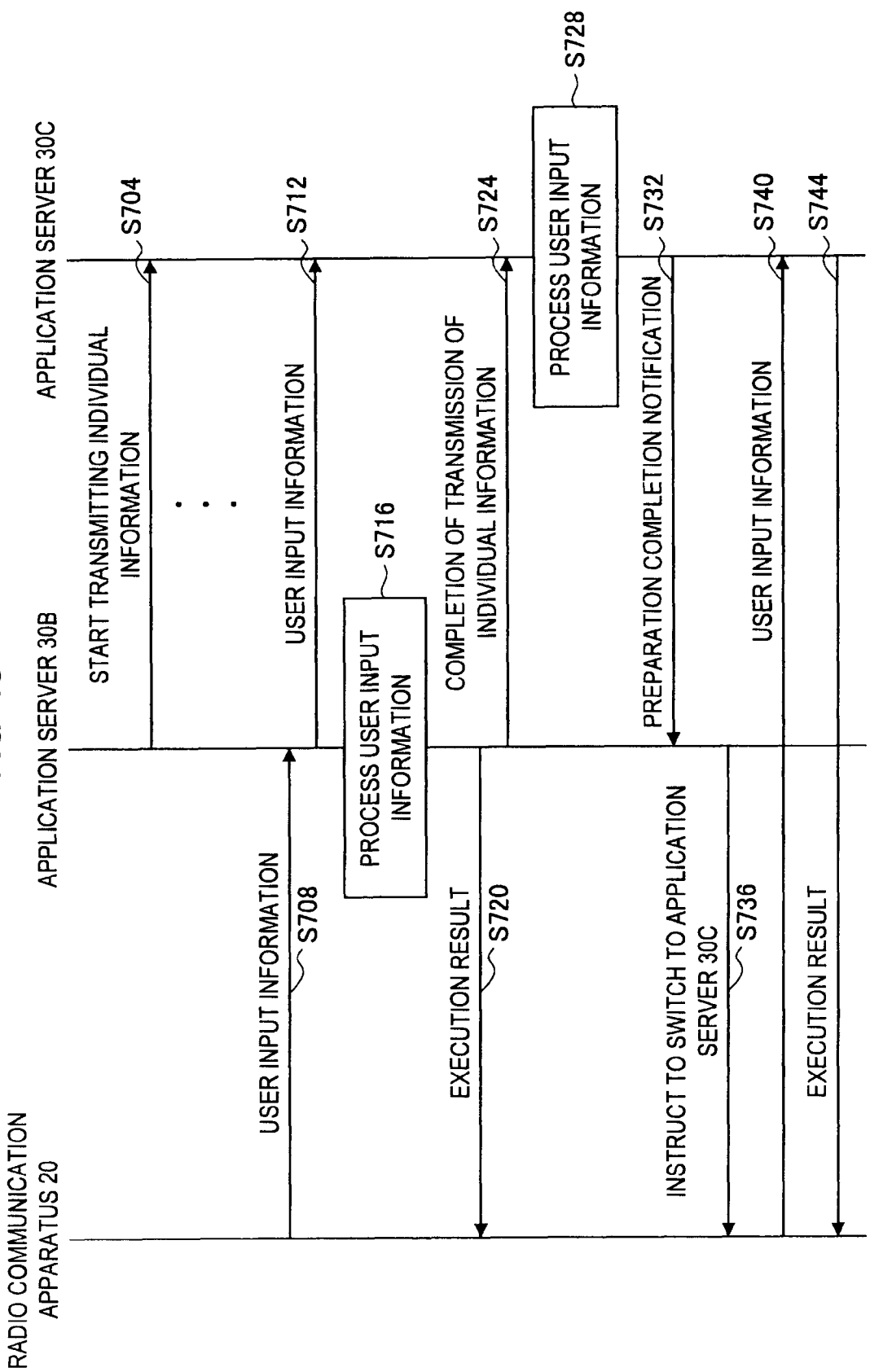
FIG. 15 is an explanatory diagram showing a sequence of a process to switch the application server.

FIG. 15 is an explanatory diagram showing a sequence of the process of switching the application servers 30. Here, the application server 30B is the currently used server and the application server 30C is the switching destination server. First, upon receiving an instruction to switch to the application server 30C, the application server 30B starts to transmit individual information of the radio communication apparatus 20 to the application server 30C (S704).

Upon receiving the user input information from the radio communication apparatus 20 during the transmission of the individual information (S708), the application server 30B transfers the user input information to the application server 30C (S712) while processing the user input information (S716), and transmits the execution result to the radio communication apparatus 20 (S720).

After that, when the transmission of individual information from the application server 30B to the application server 30C is completed (S724), the application server 30C applies the received individual information to the application and processes the user input information in the data-applied application (S728).

Then, upon receiving information indicating that preparation for switching is completed from the application server 30C (S732), the application server 30B instructs the radio communication apparatus 20 to switch to the application server 30C (S736). After that, the radio communication apparatus 20 transmits the user input information to the application server 30C (S740) and the application server 30C processes the user input information and transmits the application execution result to the radio communication apparatus 20 (S744).

As described above, according to the present embodiment, the application server 30 can be switched without suspending the execution of the application while maintaining the progressing state of the application.

In the above example, the application server 30B instructs the radio communication apparatus 20 to access the application server 30C; however, the present embodiment is not limited to this example. For example, the network 12 may change routing so that the radio communication apparatus 20 and application server 30C can communicate with each other.

Further, in the above example, individual information is transmitted to the switching destination application server 30; however, a subject to be transmitted to the switching destination application server 30 is not limited to the individual information. For example, when the switching destination application server 30 does not have an application program, an application program may be included in the subject to be transmitted. Here, the application program does not need to be acquired from the currently used application server 30 and may be acquired dispersively from plural sections using a P2P technique. Further, operation may be changed according to the specification of the radio communication apparatus 20. Thus, the subject to be transmitted may include the size of a display screen of the radio communication apparatus 20 or device information indicating the specification of the display screen.

<7. Conclusion>

As described above, according to the communication system 1 of the present embodiment, the application server 30 is switched according to need when a handover between base stations is executed, thereby suppressing undesirable influence applied to the application execution quality due to the handover between the base stations. Further, according to the present embodiment, the application server 30 can be switched without suspending the execution of the application while maintaining the progressing state of the application.

It should be understood by those skilled in the art that various modifications, combinations, sub-combinations and alterations may occur depending on design requirements and other factors insofar as they are within the scope of the appended claims or the equivalents thereof.

For example, the steps of processes in the communication system 1, management server 10 and application server 30 of this specification may not necessarily be executed in chronological order of the sequence or flowcharts. For example, the steps of the processes in the management server 10 and application server 30 may be executed in the order different from the orders shown in the sequence and flowcharts or may be executed in parallel.

Further, the hardware such as a CPU, ROM, and a RAM installed in the management server 10 may be a computer program to achieve functions relevant to the respective configuration elements of the management server 10. Further, a storage medium storing the computer program is provided.

The present application contains subject matter related to that disclosed in Japanese Priority Patent Application JP 2009-257793 filed in the Japan Patent Office on Nov. 11, 2009), the entire content of which is hereby incorporated by reference.

What is claimed is:

1. A communication system comprising:
   plural application servers;
   a first base station and a second base station; and
   a radio communication apparatus configured to use one of the application servers via the first base station, wherein,
   when the radio communication apparatus is handed over to the second base station, it is determined whether to switch the application server that the radio communication apparatus uses to another application server based on a communication quality of a communication path,
   the communication path is a communication path between the second base station and the application server, or a communication path between the radio communication apparatus and the application server including a communication path between the second base station and the application server,
   the application server transmits individual information related to an application of the radio communication apparatus stored in the application server at a certain timing to the another application server and, upon receiving input information from the radio communication apparatus after starting transmission of the individual information, executes a process based on the input information and transfers the input information to the another application server, and
   after receiving and storing the individual information from the application server, the another application server executes a process based on the input information transferred from the application server, and switching from the application server to the another application server is performed after the process based on the input information is completed by the another application server.

2. The communication system according to claim 1, wherein, when the communication quality of the communication path between the second base station and the application server fails to satisfy a predetermined criterion, the application server that the radio communication apparatus uses is switched to the another application server whose communication quality of a communication path including the communication path with the second base station satisfies the predetermined criterion.

3. The communication system according to claim 2, wherein, after confirming that the radio communication apparatus is to be handed over to the second base station, the communication quality of the communication path between the second base station and the application server is acquired from communication between the second base station and the application server, and the communication quality of the communication path including the communication path between the second base station and the another application server is acquired from communication between the second base station and the another application server.

4. The communication system according to claim 2, wherein the communication quality of the communication path between the second base station and the application server is acquired from preparative communication between the second base station and the application server, and
the communication quality of the communication path including the communication path between the second base station and the another application server is acquired from preparative communication between the second base station and the another application server.

5. The communication system according to claim 1, further comprising:
   a management server configured to determine whether to switch the application server to the another application server based on the communication quality of the communication path between the second base station and the application server and the communication quality of the communication path between the second base station and the another application server,
   wherein the application server starts to transmit the individual information according to an instruction from the management server.

6. The communication system according to claim 5, wherein the management server stores one or more candidate application servers in association with the second base station and instructs the one or more candidate application servers to perform the preparative communication with the second base station.

7. A communication method, comprising the steps of:
   using, by a radio communication apparatus, an application server via a first base station; and
   handing over the radio communication apparatus from the first base station to a second base station, wherein,
   when the radio communication apparatus is handed over to the second base station, it is determined whether to switch the application server that the radio communication apparatus uses to another application server based on a communication quality of a communication path;

the communication path is a communication path between the second base station and the application server, or a communication path between the radio communication apparatus and the application server including a communication path between the second base station and the application server;

the application server transmits individual information related to an application of the radio communication apparatus stored in the application server at a certain timing to the another application server and, upon receiving input information from the radio communication apparatus after starting transmission of the individual information, executes a process based on the input information and transfers the input information to the another application server; and after receiving and storing the individual information from the application server, the another application server executes a process based on the input information transferred from the application server, and switching from the application server to the another application server is performed after the process based on the input information is completed by the another application server.

8. A radio communication apparatus comprising:

a communication unit configured to communicate with an application server which is currently in use via a first base station, wherein, when the radio communication apparatus is handed over to a second base station, the application server that the radio communication apparatus uses is switched to another application server in a case where a communication quality of a communication path fails to satisfy a predetermined criterion, the communication path is a communication path between the second base station and the application server, or a communication path between the radio communication apparatus and the application server including a communication path between the second base station and the application server, the application server transmits individual information related to an application of the radio communication apparatus stored in the application server at a certain timing to the another application server and, upon receiving input information from the radio communication apparatus after starting transmission of the individual information, executes a process based on the input information and transfers the input information to the another application server, and after receiving and storing the individual information from the application server, the another application server executes a process based on the input information transferred from the application server, and switching from the application server to the another application server is performed after the process based on the input information is completed by the another application server.

* * * * *